United States Patent
Schawe

(10) Patent No.: US 8,087,857 B2
(45) Date of Patent: Jan. 3, 2012

(54) METHOD AND APPARATUS FOR MACHINING WORK PIECES

(75) Inventor: Bernard Edward Schawe, Taylor Mill, KY (US)

(73) Assignee: Mazak Corporation, Florence, KY (US)

( * ) Notice: Subject to any disclaimer, the term of this patent is extended or adjusted under 35 U.S.C. 154(b) by 0 days.

(21) Appl. No.: 12/719,375

(22) Filed: Mar. 8, 2010

(65) Prior Publication Data
US 2010/0158628 A1    Jun. 24, 2010

Related U.S. Application Data

(63) Continuation of application No. 11/774,049, filed on Jul. 6, 2007, now Pat. No. 7,674,079.

(60) Provisional application No. 60/806,673, filed on Jul. 6, 2006.

(51) Int. Cl.
*B23B 3/00* (2006.01)

(52) U.S. Cl. ............... 409/74; 29/33 T; 82/1.4; 408/37; 409/199; 409/231; 470/66

(58) Field of Classification Search ............ 409/66–67, 409/73–74, 78, 192, 203, 213, 217, 199–200, 409/231; 408/36–37, 39, 41–43; 82/1.2, 82/1.4, 1.5, 110, 113; 29/33 T; 470/66–67
See application file for complete search history.

(56) References Cited

U.S. PATENT DOCUMENTS

| | | | |
|---|---|---|---|
| 2,004,540 A | 6/1935 | Smith et al. | |
| 2,179,602 A | 11/1939 | Smith | |
| 2,242,487 A | 5/1941 | Swanson | |
| 2,451,497 A * | 10/1948 | Kratchman | 409/74 |
| 2,526,762 A | 10/1950 | Miller | |
| 2,551,517 A | 5/1951 | Webb | |
| 2,633,039 A | 3/1953 | Baney et al. | |
| 2,721,390 A | 10/1955 | Pasturczak | |
| 2,831,386 A * | 4/1958 | Woytych | 82/131 |
| 3,075,415 A | 1/1963 | Dabringhaus | |
| 3,108,699 A | 10/1963 | Anschutz | |
| 3,419,963 A | 1/1969 | Williams | |

(Continued)

FOREIGN PATENT DOCUMENTS

JP    52-036391 A    3/1977

(Continued)

OTHER PUBLICATIONS

International Search Report and Written Opinion of the International Searching Authority dated May 19, 2008 for International Application PCT/US07/72950, 10 pages.

*Primary Examiner* — Daniel Howell

(74) *Attorney, Agent, or Firm* — Fitch Even Tabin & Flannery

(57) ABSTRACT

A method and apparatus are provided to machine a curved surface such as an inner or outer peripheral surface of a pipe. The pipe is held stationary during machining and a rotatable spindle of a machine head moves along multiple orthogonal axes to align the rotational axis of the spindle with the longitudinal pipe axis. Preferably, the pipe axis is located by using a touch probe to engage the curved surface at multiple spots and the calculating the location of the pipe axis. The cutting tool, which is preferably a cutting tool insert, is rotated by the spindle to machine the curved surface.

7 Claims, 11 Drawing Sheets

U.S. PATENT DOCUMENTS

| | | | | |
|---|---|---|---|---|
| 3,502,124 | A | 3/1970 | Mater | |
| 3,526,167 | A | 9/1970 | Escobedo | |
| 3,740,160 | A * | 6/1973 | Kimura et al. | 408/2 |
| 3,762,272 | A * | 10/1973 | Escobedo | 409/74 |
| 4,250,775 | A | 2/1981 | Jerue et al. | |
| 4,281,385 | A | 7/1981 | Nakaso et al. | |
| 4,400,118 | A | 8/1983 | Yamakage et al. | |
| 4,577,535 | A * | 3/1986 | Klabunde et al. | 82/118 |
| RE32,211 | E * | 7/1986 | Jerue et al. | 82/1.2 |
| 4,599,769 | A | 7/1986 | Latzko et al. | |
| 4,667,548 | A | 5/1987 | Astle et al. | |
| 4,773,292 | A * | 9/1988 | Iwata et al. | 82/162 |
| 4,899,628 | A * | 2/1990 | Seichter et al. | 82/131 |
| 5,035,554 | A * | 7/1991 | Nickols | 409/131 |
| 5,104,268 | A | 4/1992 | Kitagawa et al. | |
| 5,713,253 | A | 2/1998 | Date et al. | |
| 6,243,962 | B1 | 6/2001 | Brock | |
| 6,565,298 | B2 * | 5/2003 | Ishida et al. | 409/200 |
| 7,674,079 | B2 | 3/2010 | Schawe | |

FOREIGN PATENT DOCUMENTS

| | | |
|---|---|---|
| JP | 59-053144 A | 3/1984 |
| JP | 63-074555 A | 4/1988 |
| JP | 01-306154 A | 12/1989 |

* cited by examiner

METHOD AND APPARATUS FOR MACHINING WORK PIECES

CROSS-REFERENCE TO RELATED APPLICATIONS

This application is a continuation of prior Application Number 11/774,049, filed Jul. 6, 2007, now U.S. Pat. No. 7,674,079 B2, issued Mar. 9, 2010, which claims benefit of U.S. Provisional Application No. 60/806,673, filed Jul. 6, 2006, which are both hereby incorporated herein by reference in their entirety.

FIELD

The invention relates to a machining system and a method of use thereof, which is particularly useful for machining large size, work pieces, such as large pipes.

BACKGROUND

Pipe used in the oil and gas industry can be about 2 feet in diameter and up to about 30 feet in length. These pipes typically have threading cut on an inner or outer diameter of each end for use in connecting adjacent sections of pipe together. Such large pipes, however, present challenges in cutting the threads in an efficient, safe, and cost effective manner. Current equipment for machining pipe threads on these large pipes is either a commercially available lathe or a horizontal machining center. However, each machine has constraints that render the machining of large size work pieces, such as pipeline for the oil and gas industry, difficult and time consuming.

One approach of threading large size pipe is to use the commercially available lathe. This equipment rotates the pipe along a horizontal axis thereof, and a stationary tool cuts the thread on the end of the pipe as it is rotated. In order to secure the pipe to the lathe, the one end of the pipe that is rotated is passed through the center of the lathe headstock and is secured thereto by clamping using chucks with gripping jaws located on the front and rear of the headstock. In order for the lathe to function correctly, the pipe must be centered on the lathe horizontal turning axis. The centering of the pipe along the lathe axis is a time consuming, labor intensive task that must be completed each time a new pipe is installed into the lathe. The centering operation is even more difficult with the large size pipes used in the oil and gas industry.

In order to center pipe on the lathe, current methods use a fixed indicator placed in the end of the pipe at the headstock. The pipe is then slowly rotated by hand in the chuck until the inner surface of the pipe contacts the indicator. When the indicator signals that the pipe is not rotating on the center of the lathe axis, the chuck jaws must then be loosened and the pipe readjusted. This trial and error process is then repeated until the pipe rotates on the center of the lathe axis as signaled by the indicator. This centering process is an extremely time consuming task that must be performed each time before the machining can begin on a new pipe. Only one end of the pipe is threaded so that to thread the other end of the pipe, it must be turned through 180 degrees to position the pipe end previously in the support area at the chuck.

Even after the large diameter pipe has been centered so that proper lathe cutting can be performed, rotating such large size pipe (i.e., about 30 feet long and about 2 feet in diameter) can also create safety concerns as well. For instance, sufficient guarding must be provided around the lathe and work piece in order to protect the operators and surrounding areas from the rotating part during machining. In addition, many pipes may be unbalanced, which creates technical and other safety issues when rotating. Rotating an unbalanced pipe at high speeds can put stress on the headstock bearings causing premature failure. The unbalanced pipe can also cause accuracy issues by causing an out-of-round condition on the threading machining. In response to unbalanced work pieces, operators need to slow the rotational speed of the pipe in the headstock in order to minimize any effect of the out-of-round condition. A large pipe also has considerable inertia to be overcome to start and stop of its rotation. Slower lathe speeds result in less than optimal cutting conditions, and also reduce tool life and add cycle time to the overall process.

Another conventional method of threading pipe is to use the horizontal machining center. In this method, the pipe is secured to a table so as not to rotate, and then moved horizontally relative to the cutting tool. The horizontal machining center provides advantages over the lathe system because the pipe does not rotate. However, current horizontal machine centers also have shortcomings such as size of the movable worktables when machining large size work pieces, such as the 30 foot long pipe for the oil and gas industry.

In a typical horizontal machining center, the machine table is an axis that must be able to move longitudinally as part of the machining operation. That is, the table must move horizontally along a feed axis so as to feed the part into the cutting head. Current movable tables are restricted in size, and only limited sizes of pipe can be mounted thereon. Existing tables are configured to accept part lengths up to about 10 feet. Constructing larger moveable tables, such as tables capable of handing a 30 foot long pipe, is not a cost effective solution.

In addition to physical constraints with the size of work piece suitable for cutting on the horizontal machining center, the thread cut by the horizontal machining center is less preferred. The threading of the inner or outer diameter of the pipe on current horizontal machining centers is through a circular interpolation movement of the tool about the non-rotating pipe rather than a true circular movement as obtained with the lathe. The circular interpolation is created by moving the machine head along two linear axes in small step movements around the circumference of the pipe to position the cutting tool at the depth or in-feed for cutting the thread. Since the thread is generated using a combination of these small linear steps, the quality of the thread and accuracy is not as good as a thread generated on a rotational axis such as used on a lathe.

When cutting a thread on piping, the horizontal machining center also tends to be more expensive to operate. For example, because of the circular interpolation movement, the cycle or cutting time is much longer compared to turning the thread on a lathe because the metal removal rate is less with thread milling (i.e., horizontal machining center) than with turning on a lathe. The perishable thread mill tool used on the machining center is also more expensive than indexable inserts used on threading tool holders in a lathe. The thread mill tools are specially ground to the thread form that they are needed to generate and must be reground when worn or discarded completely if broken. The indexable inserts commonly used in lathe operations, on the other hand, are readily available in the industry for many types of thread forms and easily changed when they are worn or broken.

The drawbacks of circular interpolation may be overcome by the use of a rotary spindle head configured to rotate a cutting tool about a rotational axis to cut a circular thread. An example of such a head is the U-TRONIC head available from D'Andrea, S.P.A. The cutting tool is positioned radially along a feed-out axis to engage the work piece at the proper thread depth and then rotated to cut the thread. However, in such systems the pipe is translated along its longitudinal axis during machining, creating the drawbacks discussed above associated with moving the machine table during the machining operation.

The horizontal machine centering also suffers from similar trial and error shortcomings described above in connection with the lathe when centering of the work piece. Current methods require a similar indicator that is mounted to the headstock center line that is swept around the inner diameter of the pipe by hand. If the indicator signals that the pipe is not on-center with the headstock then the pipe must be adjusted. As with the lathe, this process is repeated until a sweep of the indicator signals that the pipe inner walls are on the center of the machine axis. This manual process is time consuming and tedious and also must be completed each time a new pipe is to be cut.

Therefore, there is a desire for a machining system and a method of use therefore, that overcomes many of the disadvantages of these prior art lathe and horizontal machining centers heretofore used with large size work pieces, such as 30 foot long pipe designed for the oil and gas industry.

SUMMARY

A new and improved method and apparatus are provided for machining curved surfaces such as outer and/or inner peripheral surfaces of a pipe. This new method and apparatus will be described in connection with an illustrated embodiment used to machine large pipes; however, the method and apparatus is not limited to only such uses. In the illustrated embodiment, the curved surfaces are cylindrical surfaces on the ends of very large pipes and threads are machined on opposite ends of the pipe. In the preferred system, the pipe is stationary. It is neither fed along a head axis relative to the cutting tool nor rotated during the cutting operation. This avoids inertia, balancing and safety problems encountered in rotating large, heavy pipes in prior art lathes and other disadvantages encountered when using horizontal machine centers as discussed above.

In accordance with an aspect of the apparatus, the pipe is mounted on a stationary work support and is not translated or rotated relative to the cutting tool. Instead, the cutting tool is translated along a radial feed-out axis to engage the work piece and then the spindle carrying the tool is rotated to machine the surface while the spindle and tool are advanced along an in-feed direction, which is parallel to the longitudinal pipe axis when a pipe is being machined. When this machining is completed, the tool is retracted from work piece engagement. Thus, only the tool is moved during thread cutting.

For machining long, large pipes, the machine tool or head is positioned to face one end of the pipe with at least a three axis machine tool having a headstock and a spindle which in-feeds in a direction parallel to the longitudinal axis of the pipe. The cutting tool is advanced along a feed-out axis to a particular depth position for cutting the pipe's interior side wall and/or its exterior side wall at the facing end of the pipe.

To achieve increased efficiency, a machining tool may be located at each of the pipe ends, and both ends of the pipe may be machined simultaneously because the pipe itself is held substantially stationary. This substantially improves the machining capacity and efficiency as compared to machining one end at a time in the prior art commercial pipe threading machines.

In accordance with another aspect, the center axis of the pipe is located in an automatic manner using a touch probe or the like mounted on the machine tool without manual intervention in a trial and error process as is conventionally done. Preferably, the center axis of the pipe is determined using calculations and the tool machine zero point of the coordinate system is adjusted to match the work piece axis. The tool head and spindle are then shifted to this pipe center axis and then the tool is shifted along the feed-out axis relative to the spindle to the proper depth or cutting position.

In accordance with another aspect, the cutting tool uses an indexable tool insert as the cutting tool to machine a thread on the work piece rather than expensive custom thread mills to generate the thread. Also, the cycle or cutting time is less using the present invention rather than an expensive thread, milling machine process to generate the thread.

DETAILED DESCRIPTION

Figure 1:
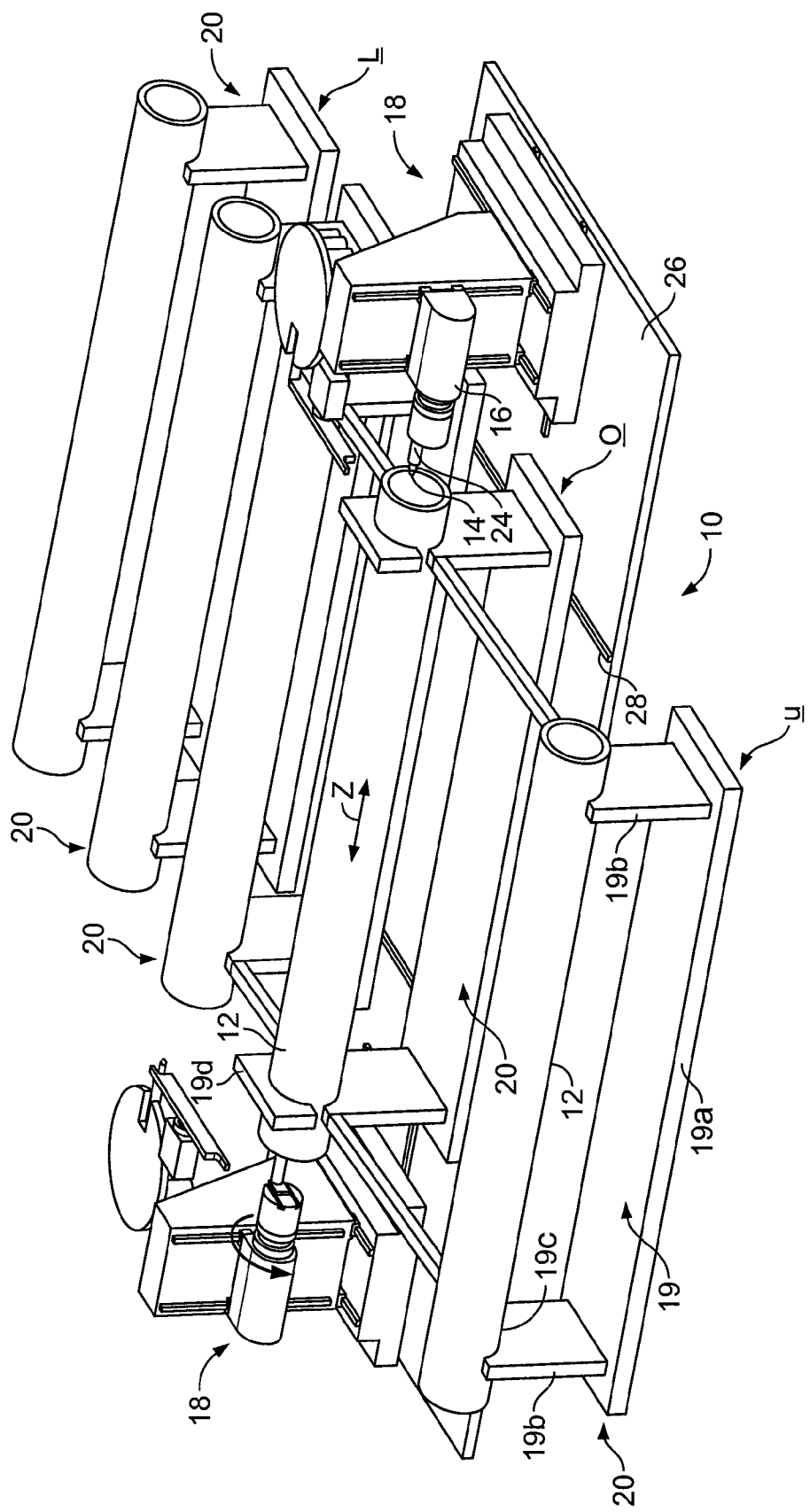
FIG. 1 is a perspective view of an exemplary machining center with multiple work pieces being shuttled into and out of an operative position in the machining center.

Referring to FIGS. 1-6, a system for machining large size work pieces in the form of a machining center 10 is illustrated. The machining center 10 employs a work piece 12 and a cutting tool 14 that is rotatably mounted to a machining head 16. Preferably, the machine center 10 is configured to machine large work pieces 12, such as pipeline for the oil and gas industry. Such pipes may have a diameter of about two feet and a length of about thirty feet; however, the center 10 may be used to machine work pieces 12 of larger or smaller dimensions.

In accordance with the illustrated embodiment, the work piece 12 is fixed, that is, the work piece 12 does not rotate or translate along a feed axis into the cutting tool 14. The machine positionings relative to the work piece are accomplished by movement of the cutting tool and machining head relative to the fixed work piece. In this illustrated embodiment, the opposite ends of the pipe are machined simultaneously in two cutting operations—one on each end of the work piece 12—to double the efficiency over the prior art systems, which can only machine one end of the work piece at a time. In the prior art lathes, only one end of the work piece can be cut at a time because the other end is being gripped to rotate the pipe. In the prior art horizontal machining center, the work piece is fed horizontally into the cutting head; therefore, a second tool cannot operate on the opposite end of the work piece because the work piece would actually be moving away from any second cutting head.

Figure 2:
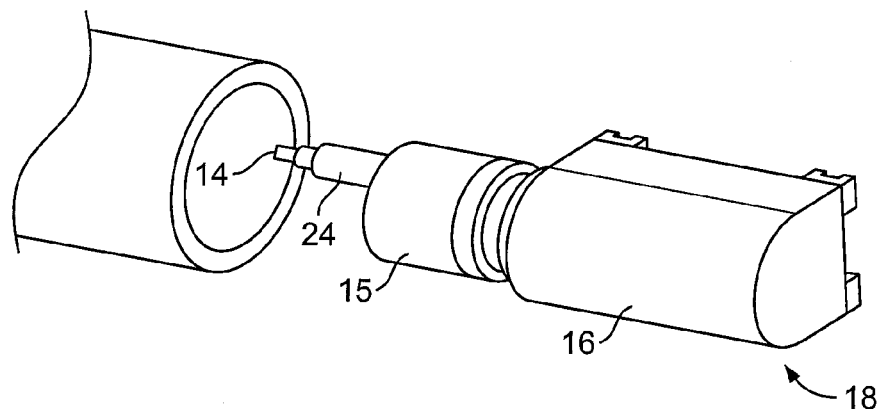
FIG. 2 is a perspective view of a headstock used with the machining center illustrated in FIG. 1.

Referring to FIGS. 1 and 2, the machine center 10 includes at least one and preferably two multi-axis machine tools 18, and at least one and preferably a plurality of fixtures or work supports 19 onto which each of the work pieces 12 is clamped. The multi-axis machining head 18 includes the cutting tool 14 mounted in a rotary spindle 15 coupled to the machining head 16. The head is operative to translate in each of three horizontal, vertical, and rotary axes. Herein, each of the work supports 19 shuttles the work pieces 12 fixed thereon into and out of an operative position at a machining position in the machining center 10. During machining, however, the work support is fixed on a stationary machine bed 26 of the machining center. That is, the work support 19 is moveable from a loading position L, where the work piece 12 is clamped thereon prior to machining, to an operative position O, where the work piece is fixed during machining operations. During machining, all movements occur in the multi-axis machining head 18 without having to move either the work piece 12 or the work support 19. In other words, during the cutting or threading operations, the work piece 12 and work support 19 are stationary and not rotated or fed into the cutting tool 14.

By not moving the work piece 12 during machining, many of the problems with the prior lathe systems have been eliminated. For example, the inertia, balancing and safety concerns of rotating or moving large diameter or long parts has been eliminated providing a safer machining center. There is no longer any need to feed the work piece through the headstock of the machine, which often constrained the size of the headstock and/or machine. Moreover, by not rotating the work piece 12, there is less stress on bearings and other components, which is especially beneficial when machining parts that may be out of balance. Eliminating the need to rotate of out-of-balance parts should also provide a better quality thread by eliminating the part out-of-roundness caused by an unbalanced condition during rotation.

The machining center 10 is also an improvement over prior art systems because the work piece 12 can be fixed very quickly and inexpensively to the work support or fixture 19 off-line in the loading position L and then automatically shuttled to the operative position O within the machining center 10. The work piece can also be secured to the work support 19 using inexpensive strap clamps rather than large expensive through hole chucks in which the work piece 12 would need to be able to pass through. In this regard, there is also little concern of centering the work piece 12 onto the work support 19 or even centering the work piece and mounting device assembly into the machining center 10. Thus, operator set-up time is significantly reduced and there is no need to employ precision locators in order to center the work piece. Moreover, as further described more below, the centering operation may be completed automatically using the multi-axis machine tool 18—minimizing the need for manual, operator intervention. For example, a centering probe 22 (FIGS. 8A, 9B, and 11) may be employed along with the multi-axis head 18 to determine the actual center axis of the work piece relative to a machine coordinate system without needing to move or readjust the fixed work piece 12. Once the actual work piece center axis is identified, then a machine coordinate system 54 (i.e., machine zero point) (FIG. 7) can be automatically adjusted in order to match the work piece actual center axis. This avoids the time consuming trial and error procedures of a lathe where the pipe is repositioned until its axis is properly aligned for the threading operation and of a milling machine center where the spindle axis is readjusted through a trial and error until the spindle axis is aligned with the longitudinal axis of the work piece. The use of mathematical calculations to readjust the machine origin eliminates the need to move the pipe or the spindle axis using the prior art slow trial and error procedure when machining pipe ends.

The center 10 also preferably machines the work piece 12 in an automatic operation. After automatic centering, the appropriate cutting or threading tool 14 having the proper thread form is automatically loaded into the rotary spindle 15 of the machine head 16. The head 16 includes both a rotational axis as well as a feed-out direction or axis. As will be discussed further below, the cutting tool 14 will be fed out using the feed-out axis X1 to the proper cutting diameter and then rotated using the rotational axis "C" of the headstock 16. The tool 14 will then be moved into the work piece 12 along the Z axis (rather than moving the work piece) in order to cut the thread. A feed-out head 24 (FIGS. 2 and 4) will extend the tool 14 along the X1 axis for each cutting pass until the proper thread depth is reached. This method of machining should provide at least the same quality thread as prior lathe turning operations since it generates the thread using a rotational axis. The method can provide a superior thread compared to the circular interpolation method of the prior thread milling methods used on a horizontal machining center. It also overcomes the shortcomings associated with prior systems utilizing a rotary head in combination of a linearly advancing work table.

The machining center 10, therefore, also permits the use of inexpensive, readily available indexable inserts 21 commonly used in lathe system rather than the more expensive custom thread mills used with traditional horizontal machining centers. Since the machining center 10 does not use the thread milling process of circular interpolations for repositioning the cutting tool to generate the thread, the cycle time or cutting time would also be much less comparable to the lathe turning process.

Turning to more of the details, the work piece 12 may be fixed to mounting or work support 19 in various manners. In one example as illustrated in FIG. 1, the work support 19 includes a base 19*a* and two spaced support arms 19*b* on opposite ends of the base 19*a*. As the work piece 12 is preferably a pipe, each support arm 19*b* preferably includes a saddle surface 19*c* to support the work piece 12 therein. That is, the surface 19*c* preferably has a curvature to match the curvature of the pipe. Clamps 19*d*, such as inexpensive strap clamps, chucks, and the like, then secure the pipe to the table arms 19*b*. The work piece 12 is loaded onto the work support 19 so that the area to be threaded is facing the headstock 16 when the work piece 12 is moved to the operative position O in the machine 10. It should be noted that the work support 19 illustrated in FIG. 1 is exemplary and other suitable mounting devices, work tables or fixtures may also be employed for supporting the work.

The work support 19 is operative to translate along the machining center base or floor 26 from the loading position L to the operative position O. In this manner, the work piece 12 may be fixed to the work support 19 as described above "off-line" and then fed into and out of the machining center 10 in an automated manner. Preferably, each of the succession of work supports 19 moves along the machine base 26 via a movement device 28, such as a track, rail, slide, wheel, bearing, conveyor, or other suitable movement fixture from a loading position and then move into the threading cutting position, and after the thread cutting operation to an unloading position.

Referring more specifically to FIGS. 2-5, the multi-axis machining tool 18 is operative to move the cutting tool 14 about a variety of axes. That is, the machine tool 18 is configured to position the cutting tool 14 in the proper cutting location through movement of the tool along a variety of horizontal, vertical, and rotational axes. In order to move the cutting tool 14 in such manner, the machine tool 18 includes multiple components, each of which are configured to move along a different axis.

Figure 3:
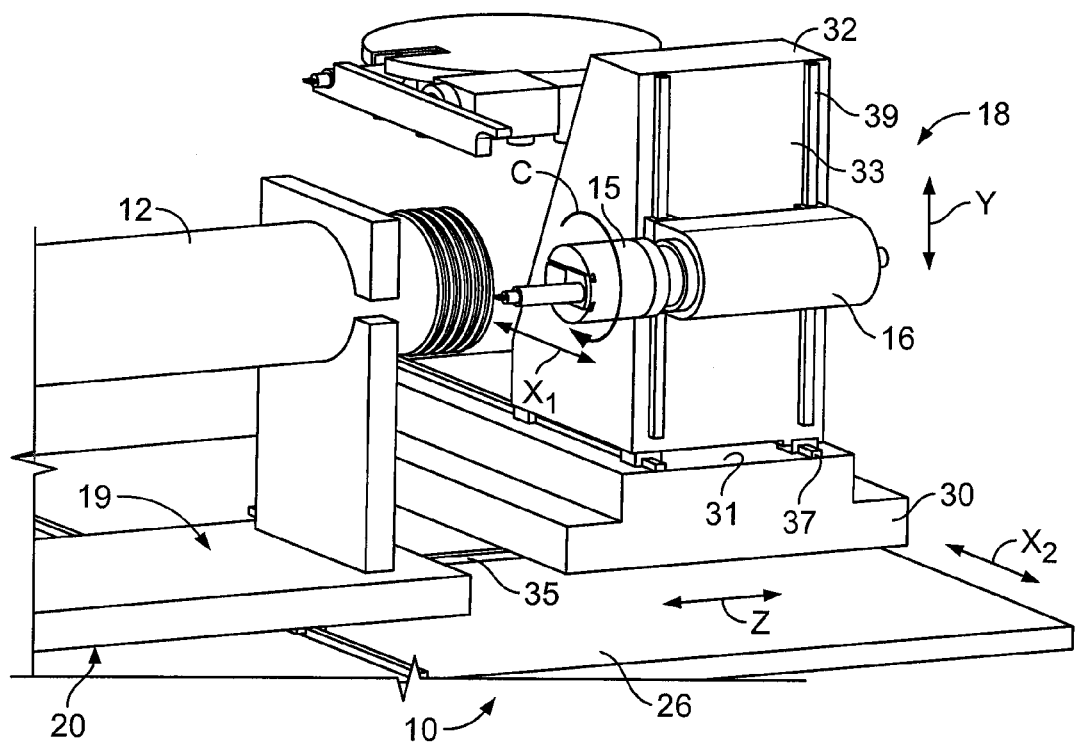
FIG. 3 is perspective view of a multi-axis head of the machining center of FIG. 1 showing multiple axes of movement thereof.
Figure 4:
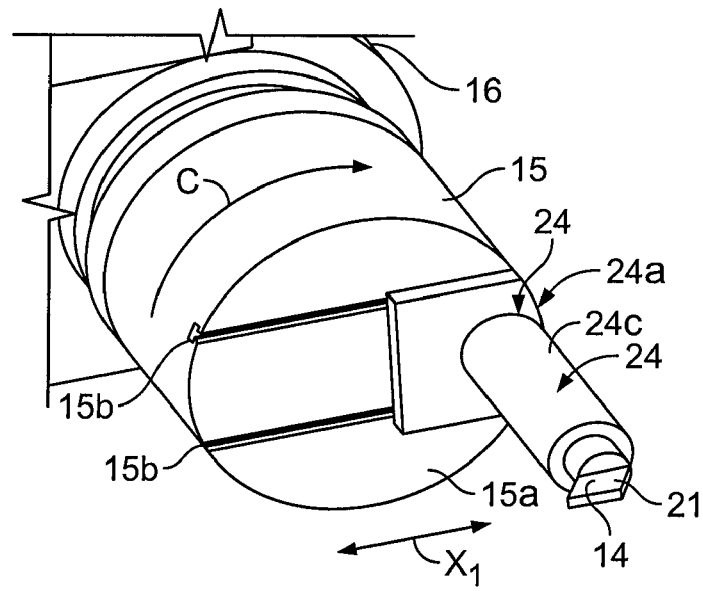
FIG. 4 is a perspective view of the headstock of FIG. 2 showing a rotary spindle and an exemplary indexable insert cutting tool thereon.

For example, as best shown in FIGS. 3 and 4, the illustrated machine tool 18 includes a movable base slide or saddle 30 configured to translate along a horizontal slide 35 along an axis Z relative to the base 26. The axis Z is generally parallel to the work piece axis and is used to feed the cutting tool 14 into and out from the work piece 12. In one embodiment, the movable base 30 has a stroke or operative distance of about 65 inches along the Z axis. On the saddle 30, a support column 32 is disposed on an upper surface 31 of the saddle 30. The column 32 is operative to move relative to the saddle 30 along a horizontal axis X2, which is normal to the Z axis and to this end is mounted on slides 37 between the bottom of the column 32 and the top of base 30. As the column moves along the X2 axis, the cutting tool 14 is moved horizontally relative to the base 26 and transverse to the Z axis. In one embodiment, the column 32 has a stroke or operative distance of about 30 inches along the X2 axis of the movable base 30. The machine head 16 is mounted to a side wall 33 of the column 32 and is configured to translate up or down the length of the column 32 along a vertical axis Y, which is transverse to both the Z and X2 axes. Vertical slides or ways 39 on the column 32 guide the machine head 16 for travel along the Y axis which results in the cutting tool 14 traveling vertically relative to the base 26. In one embodiment, the machine head 16 has a stroke or operative distance of about 26 inches along the Y axis of the column 32. Mounted to the machine head 16 is the rotary spindle 15, which rotates relative to the machine head 16 along a rotary axis C. In one form, the rotary spindle 15 is configured to rotate between about 200 to about 500 rpm. Within the rotary spindle 15 is a small feed-out head 24 that translates inwardly or outwardly relative to the rotational axis C of the rotary spindle 15 along the feed-out axis X1, and the tool is shifted along this X1 axis to engage the cutting tool 14 with the work piece and also to achieve the proper thread depth being cut. In one embodiment, the feed-out head 24 has a stroke or operative distance of about 12 inches along the X1 axis relative to the rotary spindle 15 and provides about 8 inches of extension from the rotary spindle. In this manner, the machine tool 18 provides for large horizontal adjustment along the X2 axis and fine horizontal adjustments along the X1 axis. While exemplary dimensions are provided above, which are preferred to machine a pipe 12 having a diameter of about 22 inches, it will be appreciated that larger or smaller dimensions are also acceptable to machine larger or smaller work pieces.

Turning to more of the details, as best seen in FIG. 4, the feed-out head 24 comprises a feed-out slide 24a mounted for sliding across circular end wall 15a of the spindle 15 within a pair of slides or grooves 15b. Herein the feed-out slide 24a comprises a flat plate or base 24b on which is fixed, in a cantilevered manner, an inner end of a cylindrical shaft 24c on the outer end of which is mounted the cutting tool insert 21. The feed-out slide 24a is spaced outwardly along the end wall of the spindle relative to the center of the spindle axis C. The feed-out head 24 may be obtained, for example, from D'Andrea, S.P.A., Italy, but other suitable heads may also be used.

The center 10 machines the fixed work piece 12 through combinations of movements along the above described axes. Preferably, each above described component may move along its associated axes via slides or other devices, such as a track, rail, slide, way, bearing, wheel, conveyor, spindle, or other suitable movement fixtures. Movement along each of the respective axes is may be controlled through conventional stepper motors or other conventional precision movement control devices.

Figure 5:
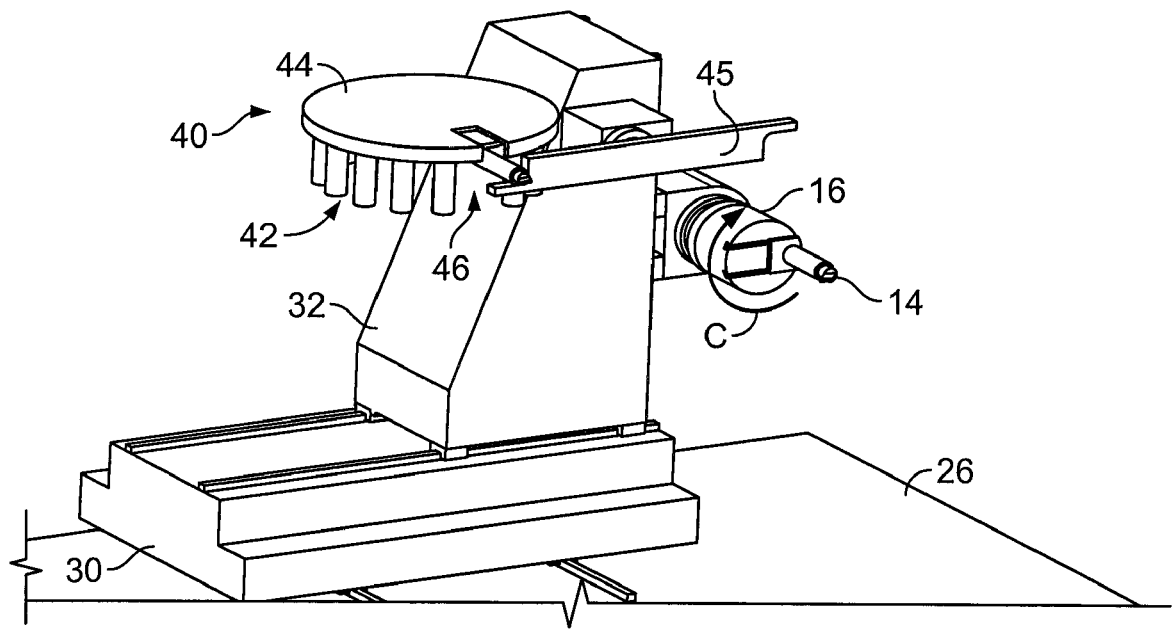
FIG. 5 is another perspective view of the multi-axis head of FIG. 3 showing a tool loading mechanism.

Referring to FIG. 5, the multi-axis machining head 18 also preferably includes a tool loading mechanism 40 to automatically load one of a variety of different tools 42, such as one or more cutting tools 14 or the centering probe 22. The loading mechanism 40 includes a tool magazine 44, which stores the tools 42 thereon when not in use, and an automatic tool change arm 45 that selects and moves the desired tool 42 from the magazine 44 to the machine head 16. In one form, the tool magazine is a disk configured to rotate in order to position a desired tool 42 in a tool receiving position 46 where the arm 45 may select and grab the desired tool. In one embodiment, the tool magazine 44 may include 24 tools, but more or less tools may be included as needed.

Figure 6:
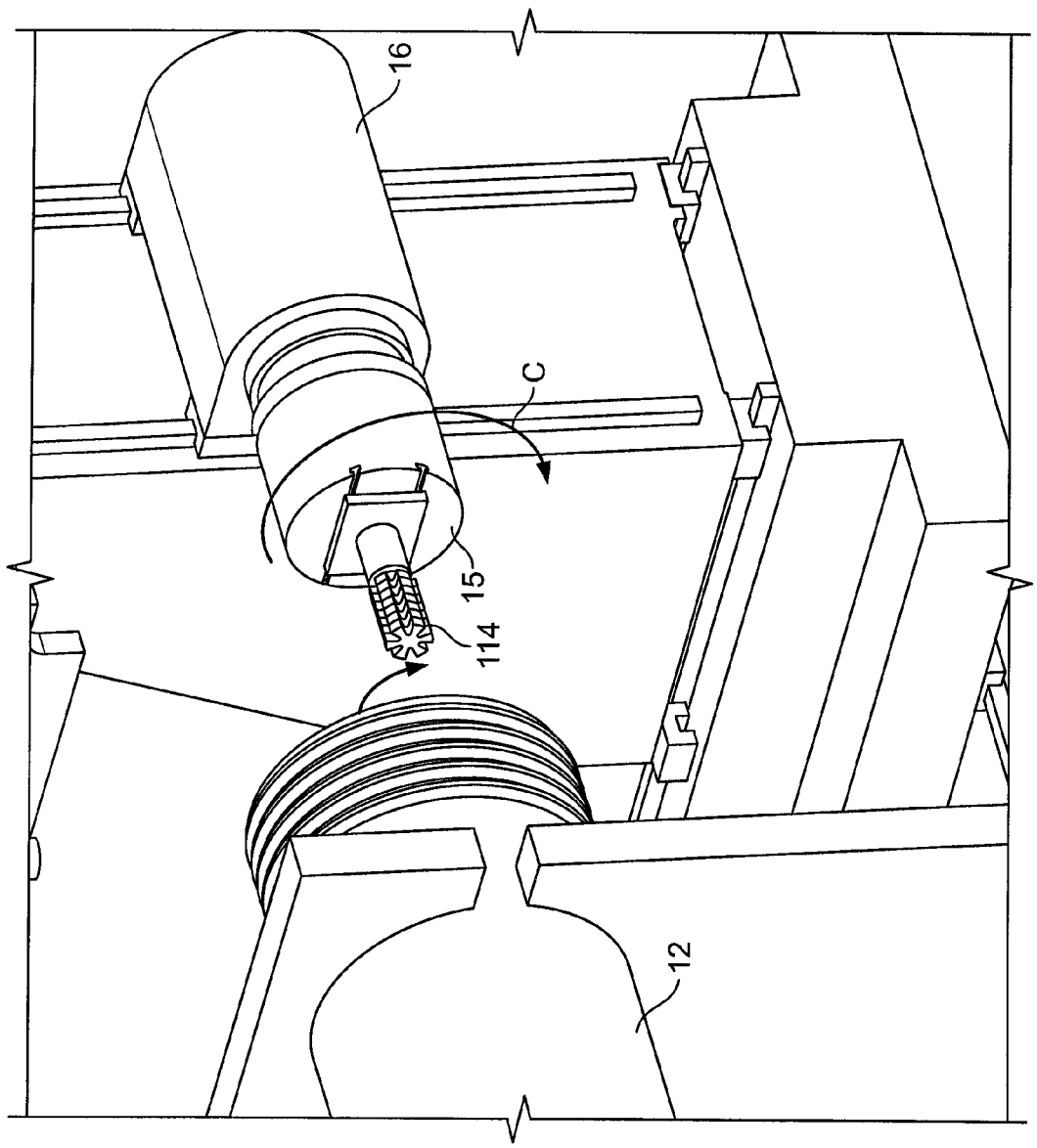
FIG. 6 is an alternative view of the rotary spindle with an exemplary thread mill tool thereon.

Referring to FIG. 6, the rotary spindle 15 of the machine head 16 is shown using an alternative cutting tool 114, which is in the form of an exemplary thread mill tool. In this form, the tool 114 is configured to machine multiple threads using a circular interpolation method. In this alternative approach, for example, the thread mill tool 114 rotates as shown in the figure.

Figure 7:
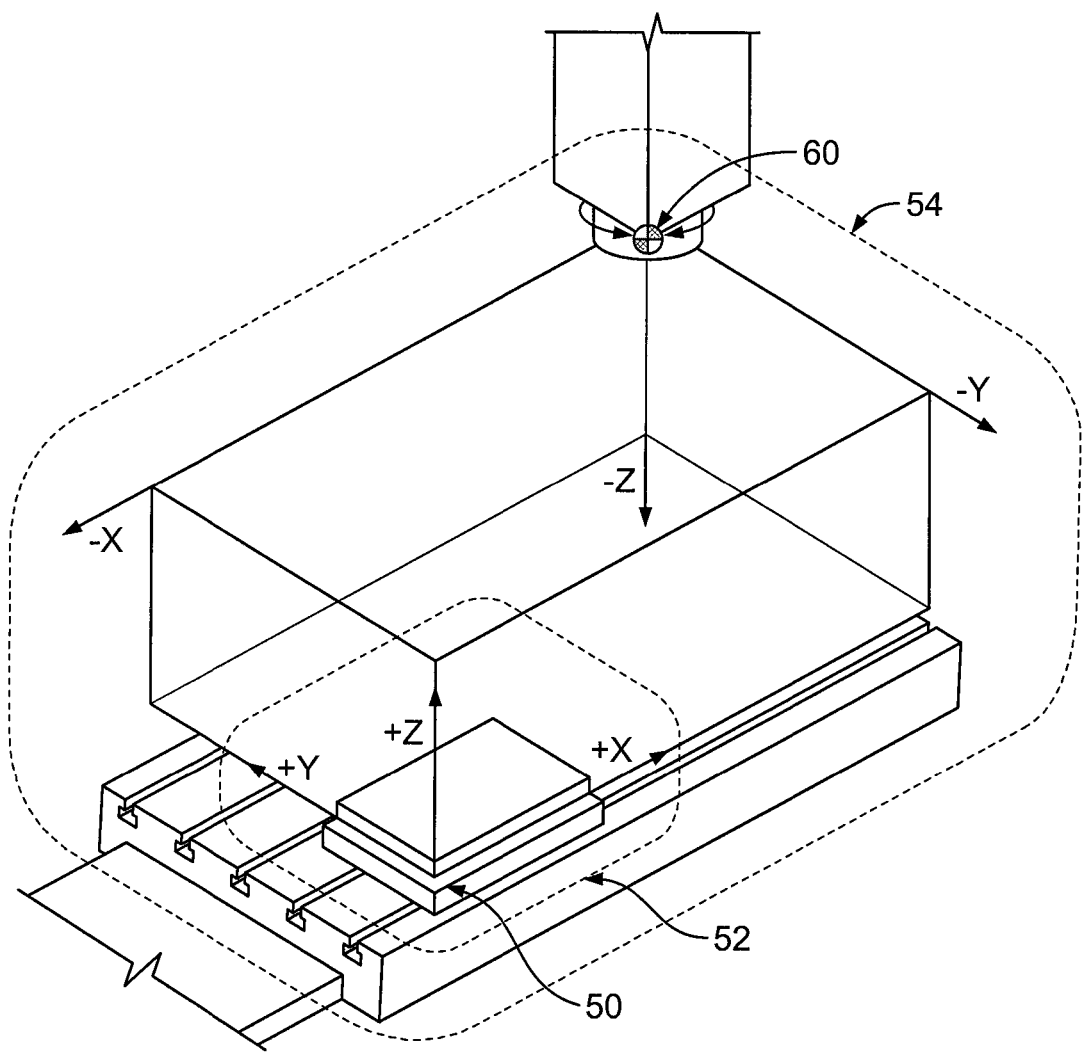
FIG. 7 is a schematic view showing the relative relationship between a machine coordinate system and a work piece coordinate system.
Figure 8A:
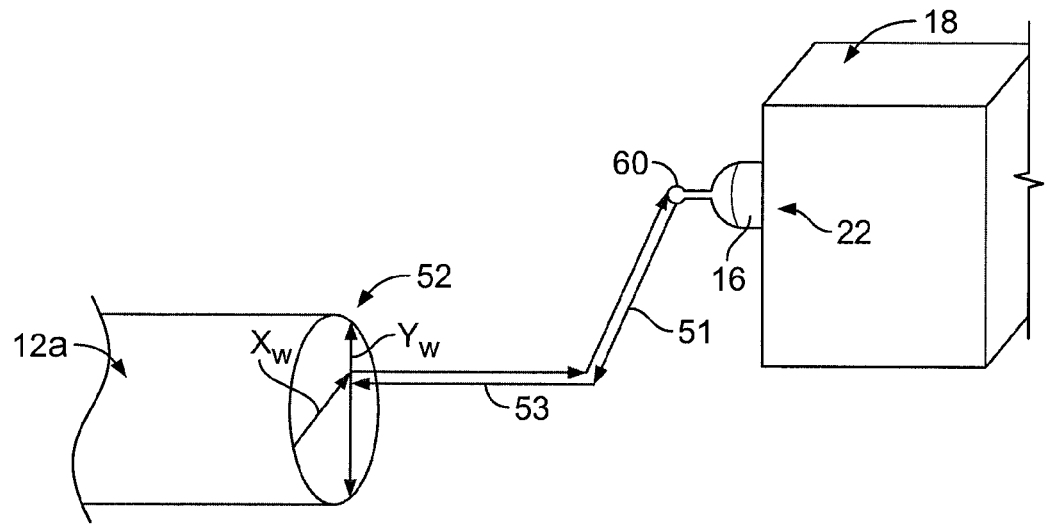
FIGS. 8A and 8B are schematic views showing a procedure for automatically centering the machining center of FIG. 1 to the actual center of the work piece.

To properly cut either inner or outer diameter threads on a work piece 12, such as a pipe 12a, the actual center of the pipe 12a is first determined. Referring to FIGS. 7-10, an exemplary automatic centering procedure is illustrated that may be used with the machining center 10 in cooperation with the centering probe 22 and the multi-axis head 18. As shown in FIG. 7, the automatic centering procedure generally compares a machine coordinate system 54 to a work piece coordinate system 52 to correctly position the headstock 16 at an actual work piece center 50 after measuring the dimensions of the work piece. In general, the centering probe 22 is first mounted to the headstock 16, and then the multi-axis head 18 moves the probe 22 along a predetermined path to measure the pipe 12a dimensions in order to calculate an actual pipe center 50 relative to a work piece coordinate system 52. Then, a machine zero point 60 within the machine coordinate system 54 is adjusted, if needed, to match the work piece coordinate system 52 based on an offset distance from the actual pipe center 50 and a projected pipe center 58.

By one approach, the centering probe 22 is preferably a coordinate measuring probe such as a touch sensor probe (Renishaw, PLC, United Kingdom) having a stylus on a measuring end that measures the dimensions of the work piece pipe after being automatically mounted into the machine spindle 15 on the machine head 16. The centering probe 22 is preferably stored in the tool magazine 44 and transferred to the rotary spindle 15 of the headstock 16 through the automatic tool change arm 45 when a new work piece 12 is loaded into the operative position. Once automatically mounted in the headstock 16, the centering probe 22 preferably locates the actual center 50 of the work piece 12 by contacting multiple interior positions through movements of the multi-axis head 18. From these positions, the actual center 50 and offset distance from the projected center may be determined. As described below, the probe 22 preferably contacts at least four positions on the pipe 12a inner surface, but any number of contact points may be used at various positions on the work piece 12 in order to determine the geometry and dimensions thereof. Alternatively, the probe 22 may contact a plurality of positions on an outer surface of the pipe 12a.

Figure 9A:
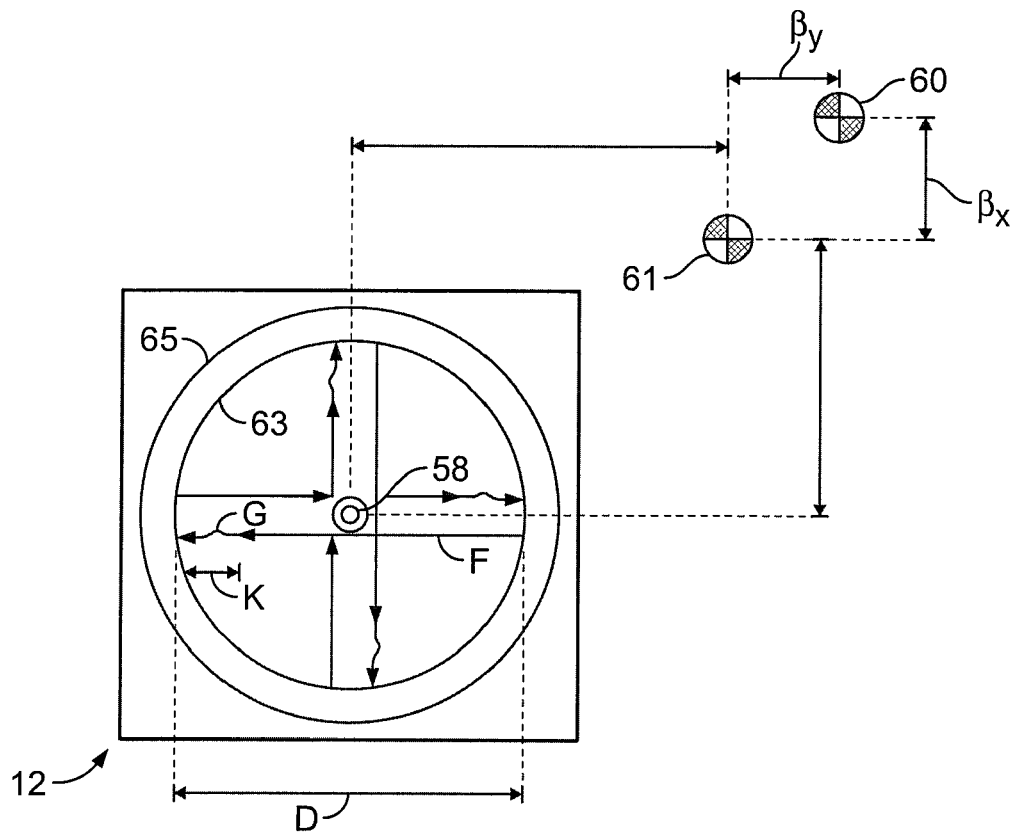
FIGS. 9A and 9B are schematic views showing a procedure for using a fail safe stop mode using both relatively slow and fast strokes of the centering probe during the automatically centering procedure to prevent damage to the centering probe.
Figure 9B:
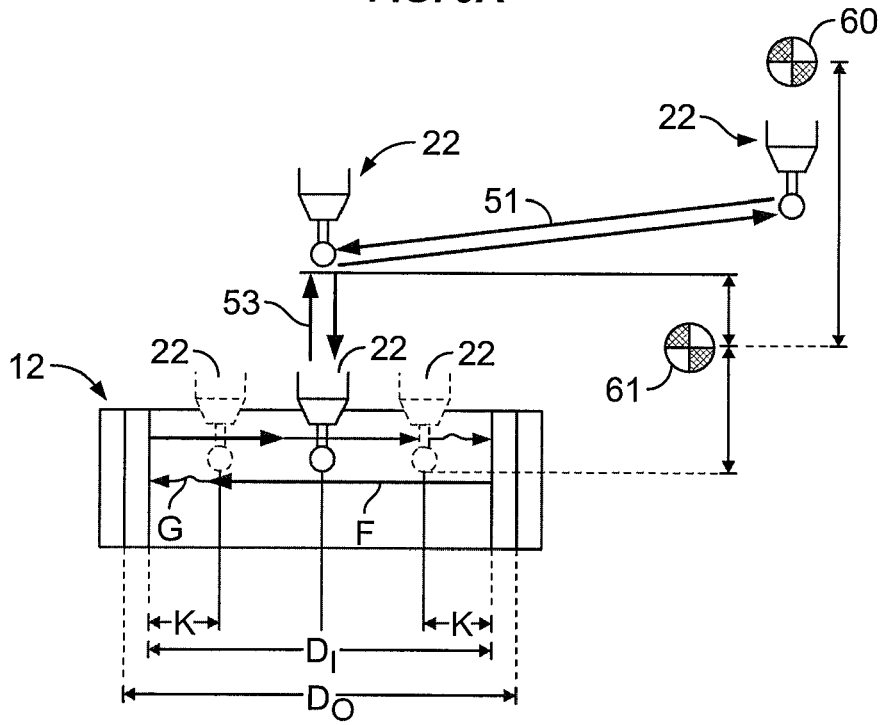
Figure 10:
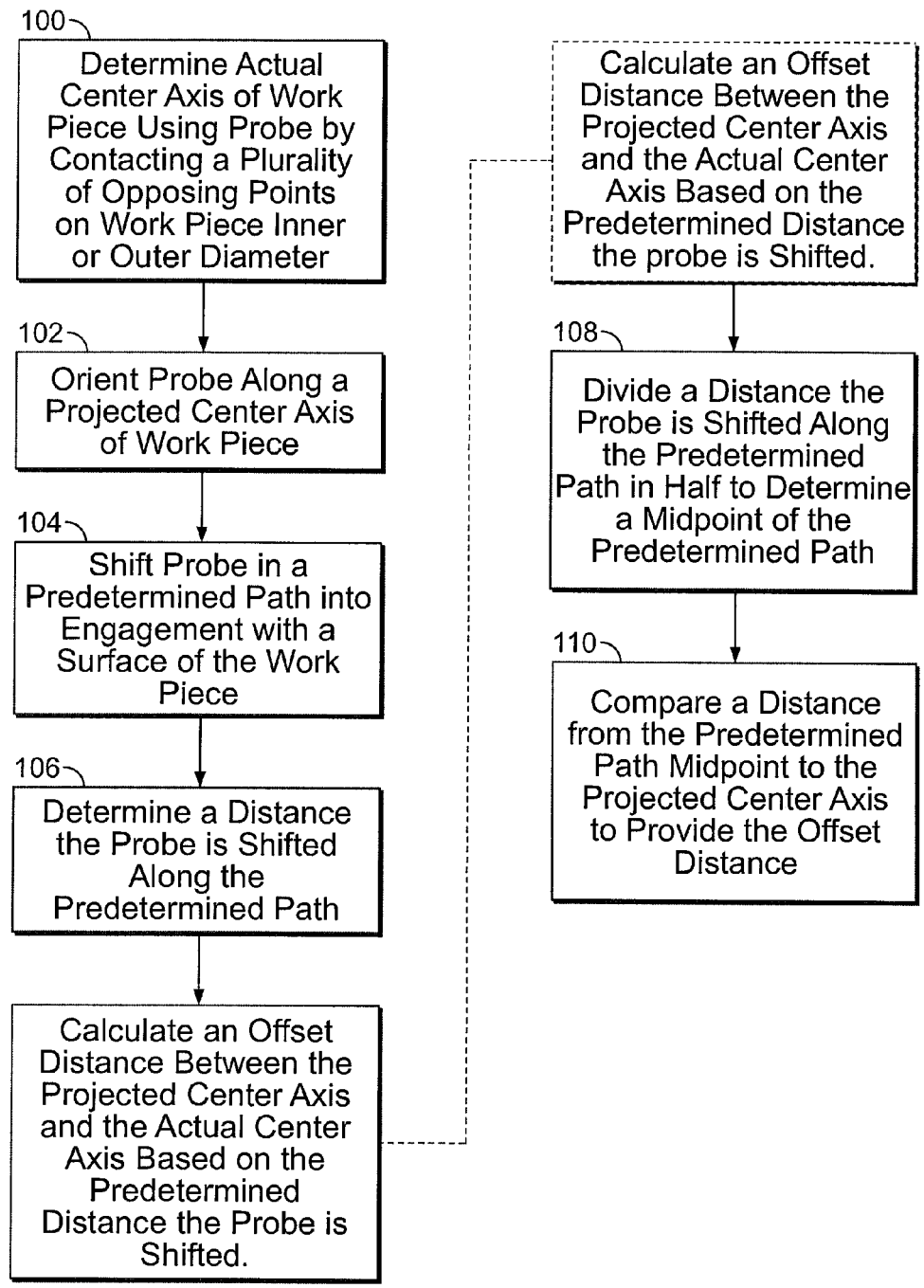
FIG. 10 is a flow chart showing an exemplary method to determine the an actual work piece center.

Referring to FIGS. 8 to 10, an exemplary centering procedure 100 is illustrated in more detail. Once the centering probe 22 is automatically mounted in the headstock 16, the multi-axis machine tool 18 will move the probe 22 along the exemplary machine paths 51 and 53 to position the probe 22 within the interior of the pipe 12a oriented 102 along the projected center axis 58. At this point, the machine tool 18 will shift or translate 104 along a predetermined path to measure the inner diameter of the pipe along both an Xw axis and an Yw axis (which are generally orthogonal to each other) of the work piece coordinate system 52 so that an offset distance β of the actual center axis 50 from a projected center axis 58 can be calculated. Preferably, the offset distance β includes distances along each of the orthogonal axes Xw and Yw and, therefore, has an X component and a Y component (βx and βy). The projected center 58 is based on the nominal diameter D of the pipe 12a.

More specifically, the multi-axis machine tool 18 will first move the probe 22 to the projected work piece center 58. The multi-axis machine tool 18 will then move the probe 22 vertically upwardly along the work piece axis Xw (Arrow A) until the probe stylus contacts an upper point 62 of an inner surface 63 of the pipe 12a. The probe 22 will then be moved vertically downwardly along the same axis Xw (Arrow B) until the stylus of the probe 22 contacts a lower point 64 of the inner surface 63 of the pipe 12a. In this manner, the predetermined path of the probe 22 generally forms a chord of the pipe 12a. The distance between the upper point 62 and the lower point 64 along the Xw axis is calculated 106 and divided in half 108 to determine the midpoint Xm along the Xw axis. An offset distance βx along the axis Xw between the projected center 58 and the actual center 50 is calculated 110 based on the distance from the projected center to the Xw axis midpoint Xm. As discussed below, a similar procedure is used along the Yw axis.

Next, the multi-axis machine tool 18 will re-position 102 the probe 22 to the projected center 58 (Arrow C) and move 104 the probe horizontally in a leftward direction along the axis Yw (Arrow D) until the probe stylus contacts a left point 70 on the inner surface 63 of the pipe 12a. The probe 22 will then be moved in a rightward direction along the same axis Yw (Arrow E) until the probe stylus contacts a right point 72 on the inner surface 63 of the pipe 12a. The distance between the right point 70 and the left point 72 is calculated 106 and divided 108 in half to determine the midpoint Ym of the pipe along the Yw axis. An offset βy along the axis Yw between the projected center 58 and the actual center 50 is calculated 110 based on the distance from the projected center to the Yw axis midpoint Ym. The probe is then retracted out of the work piece 12 generally along machine paths 51 and 53.

Figure 8B:
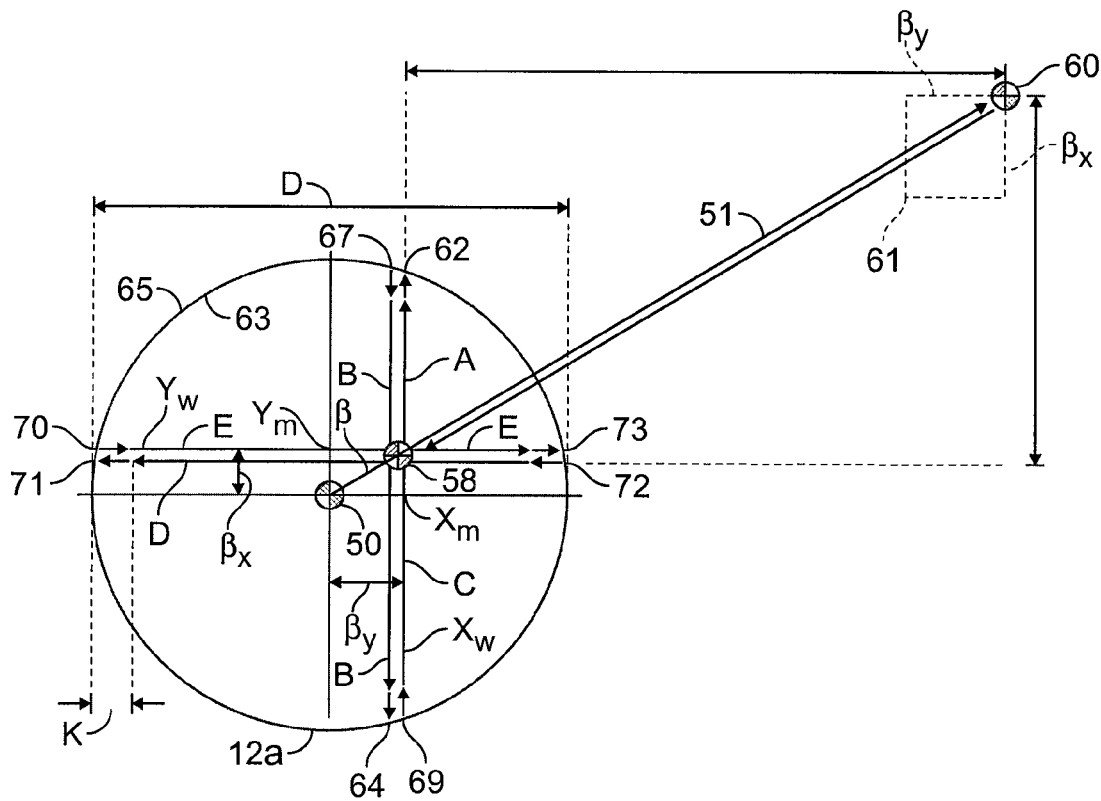

The distance from the projected center 58 along the Xw and Yw axes to the actual center 50 is the calculated offset distance (βx, βy). The zero point 60 of the machine coordinate system 54 is then adjusted by the same offset (βx, βy) to an adjusted machine zero point 61 in order to match the machine coordinate system 54 to the actual work piece center 50 (FIG. 8B and FIG. 9A). This centering procedure is completed with minimal, and preferably no, manual intervention by the operators, such as re-adjusting the work piece, in contrast to procedures for the conventional lathe and milling machines for machining large pipes.

Referring to FIGS. 9A and 9B, the automatic centering method may also employ a fail safe stop mode in case the nominal inside diameter Di of the pipe 12a is significantly different that what is being measured by the probe 22. The nominal diameter Di may be different than what is being measured because it was incorrectly inputted into the controller or the nominal diameter was incorrectly provided with the new pipe. This fail safe stop mode prevents damage to the centering probe 22 or the stylus thereon due to an incorrect pipe diameter.

For example, during a measurement cycle, when the probe 22 approaches a predetermined distance to the inner wall 63, the multi-axis machine tool 18 will move the probe 22 slower until it actually contacts the wall 63. Preferably, once the probe 22 is within the predetermined distance to the pipe inner wall 63, such as a distance K, the probe 22 will move slower until it either contacts the pipe inner surface 63 or does not contact the pipe within a predetermined length of movement (i.e., a time out distance). The distance K may be determined as a percentage of the nominal inside diameter Di of the pipe. By one approach, the distance K is about 10 percent of the inside diameter Di; however, other distances will also work. If the probe 22 does not contact the wall 63 within this set limit K, then an error message or alarm will be signaled to indicate that the work piece 12a has a size different than originally expected.

For example, as best illustrated in FIG. 9, the probe 22 initially moves relatively fast along the Yw axis, such as along Arrow F until it reaches the distance K from the pipe wall 63. At this point, the probe 22 moves in a relatively slow speed represented by the wavy Arrow G through this distance K until the probe actually contacts the wall 63 or fails to contact the wall within the prescribed distance. The probe 22 will preferably operate in a similar manner when moving along the other axes.

A similar centering procedure may also be used to determine the thickness and/or outer diameter (Do) of the work piece 12. For example, the probe 22 may contact opposing outer surfaces 65 of the work piece 12 in a similar manner to that previously described except that the probe 22 will be outside the work piece 12 rather than measuring inside the work piece 12. For example, the probe 22 may be positioned to contact opposing points 67 and 69 on the outer surface 65 of the work piece 12 generally along the Xw axis, and also contact opposing points 71 and 73 on the outer surface 65 of the work piece 12 generally along the Yw axis. Then, differences between the inner contact points (62, 64); (70, 72) and the outer contact points (67, 69); (71, 73), respectively, may then be used to calculate a thickness of the work piece.

Figure 11:
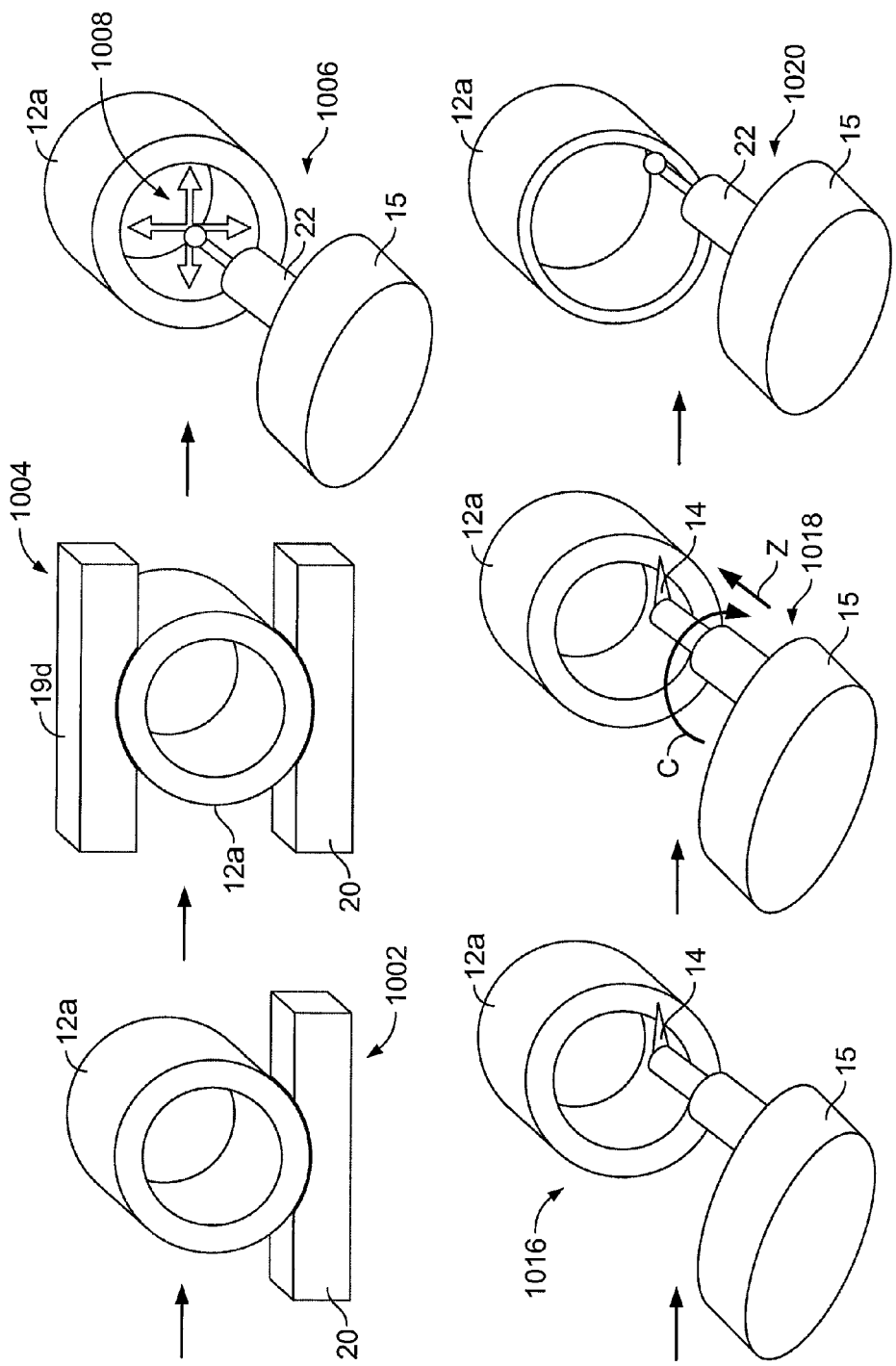
FIG. 11 is a schematic view showing an exemplary method of using the machining center of FIG. 1 to automatically measure and calculate the actual work piece center and to machine the work piece.
Figure 12:
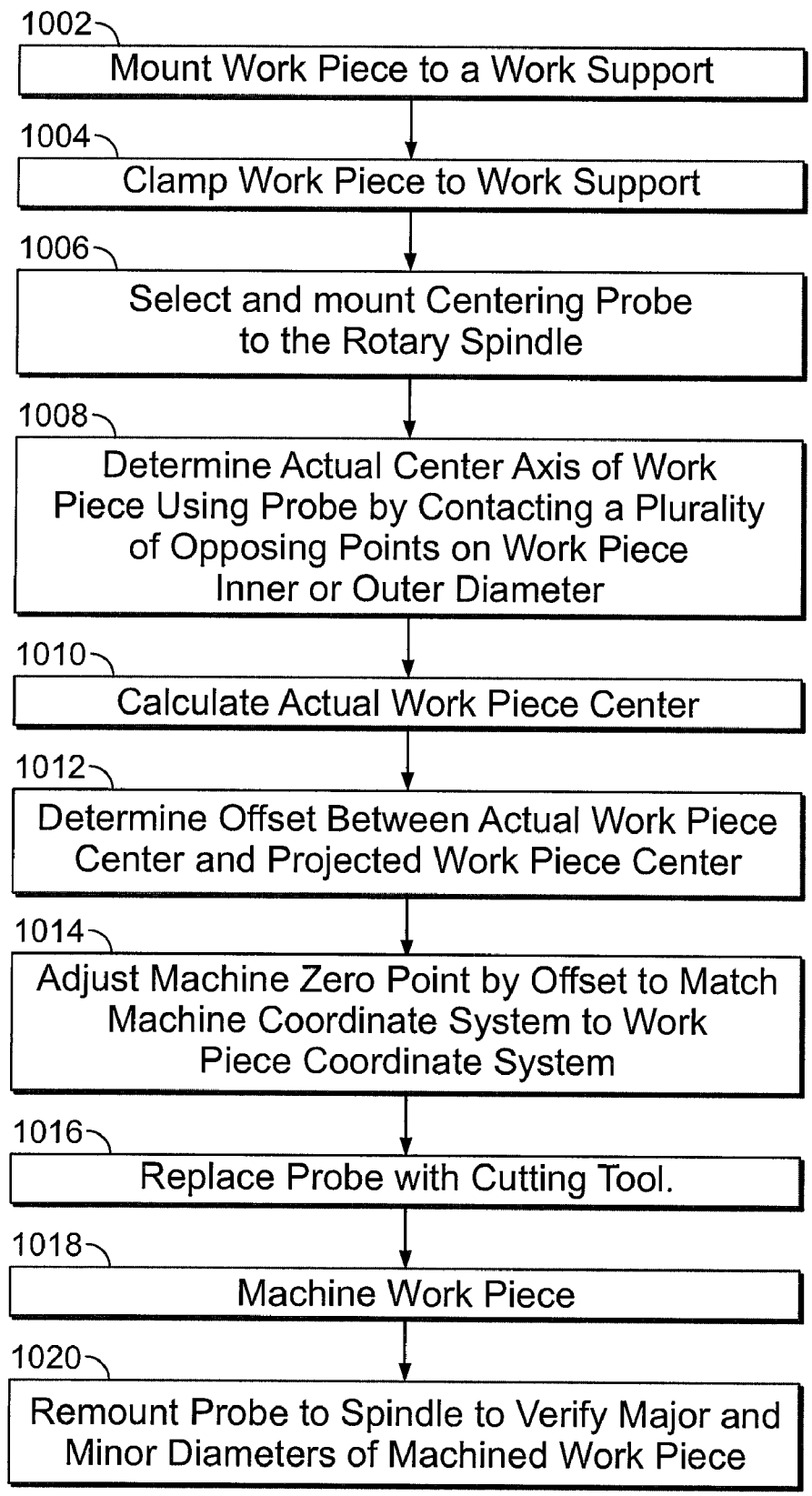
FIG. 12 is a flow chart showing an exemplary method of using the machining center of FIG. 1.

Referring to FIGS. 11 and 12, an exemplary method of machining the work piece 12 using the machining center 10 is generally illustrated. In this example, the work piece 12 is preferably the pipe 12a; however, the methods described herein may also be used in a similar fashion to machine other types of work pieces.

First, the pipe 12a is mounted 1002 into the fixture or work support 19. Second, the pipe 12a is clamped 1004 to the work support 19 using the clamps 19d, such as the inexpensive strap clamps. As discussed above, the mounting and clamping steps can be completed off-line in the loading position L (FIG. 1). When the machining center 10 is ready to machine the pipe 12a, it is shuttled into the operative machining position O (FIG. 1). (The remaining steps illustrated in FIG. 11 show the mounting device and clamp 19d removed for clarity.) Third, the centering probe 22 is automatically selected 1006 by the automatic tool change arm 45 and mounted to the rotary spindle 15 of the machine head. The centering probe 22 then is used to determine 1008 the actual pipe center 50 and calculates 1010 the actual center 50 of the work piece and calculates 1012 an offset β from the projected work piece center 58. The offset β is used to adjust 1014 the machine zero point 60 within the machine coordinate system 54 an amount corresponding to the offset β so that the machine coordinate system 54 is matched to the actual center 50 of the pipe 12a. As mentioned above, this centering process is competed without the time-consuming repositioning of the work piece 12 or the work support. Fourth, the desired cutting tool 14 is selected and interchanged 1016 with the probe 22 by the automatic tool change arm 45. Fifth, the saddle 30, column 32, headstock 16, and feed-out head 24 shift the tool 14 near the exterior or interior surface of the pipe end through various combinations of movement along the X1, X2, Y, and Z axes. The rotary spindle 15 is then rotated at a predetermined rpm about rotary axis C and is in-fed in the Z direction to machine 1018 the work piece. If desired, multiple passes are completed to cut a deeper thread. Lastly, the probe 22 is again loaded 1020 into the machine head 16 via the automatic tool change arm 45 to inspect the finished thread and diameters thereof by probing both the major and minor diameters of the machined work piece. If acceptable, the part is fed out of the machine.

Referring to FIGS. 1 and 11, each operation of the exemplary machining cycle will be described in more detail using the pipe 12a as an exemplary work piece 12. First, the pipe 12a is loaded onto the work support 19. That is, the pipe 12a is mounted onto the support arms 19b of the table 19 and clamped thereon by the clamps 19d. This loading is preferably accomplished in the "off-line" or loading position L. The machine table 19 with the pipe 12a mounted/clamped thereon is automatically shuttled to the operative position O via the movement device 28 when the machine center 10 is ready to machine the new part.

Next, the auto centering procedure will be completed. The tool magazine 44 will rotate to position the touch sensor probe 22 stored thereon within the tool change position 46. The touch sensor probe 22 will be placed into the machine head 16 from the tool magazine 44 by the automatic tool change arm 45. The various components of the multi-axis machine head 18 will then move the probe 22 via the movement devices 35, 37 and 39 to determine the actual pipe center 50 and the offset β from the projected center 58 as described above. The zero point 60 of the machine coordinate system 54 will be adjusted appropriately.

Once centered, the machining operation will begin. The multi-axis machine head 18 will first move the touch sensor probe 22 to the automatic tool change position. The tool magazine 44 will then rotate to select a desired threading tool 14 and exchange the touch sensor probe 22 in the machine head 16 for the threading tool 14 in the tool magazine 44 by using the automatic tool change arm 45. With the threading tool 14 now in the machine head 16, the multi-axis machine head 18 will move to the actual center 50 of the pipe 12a and position the threading tool 14 along the Z axis near the face of the pipe 12a. The feed-out head 24 will then move the threading tool 14 along the feed-out axis X1 to the proper diameter of the pipe 12a for the first threading cut pass.

The machine head 16 will then rotate the rotary spindle 15 at the programmed RPM (i.e., generally between about 200 and about 500 rpm) and the multi-axis head 18 will feed the threading tool 14 into the pipe 12 in the Z direction to the programmed thread length at the programmed feed rate. It will be appreciated by one skilled in the art that the profile of the machined thread will generally depend on the depth of the cut, the feed rate of the machine tool, the rotation speed of the tool, and the number of passes. Once the cutting tool reaches the programmed length along the machine Z axis, the tool 14 will be retracted along the feed-out axis X1 from the part 12a for clearance. The machine tool 18 will then return the tool 14 along the Z axis to the start position.

Once back at the Z axis starting position, the threading tool 14 will be positioned along the feed-out axis X1 at the proper diameter for a second threading cut pass if so desired. This process will continue with the tool 14 being positioned along the feed out axis X1 for each threading pass until the proper thread depth is reached. Once the threading process is completed, the machine head 16 will stop rotating the rotary spindle 15 and the multi-axis machine head will position the threading tool 14 in the automatic tool change position where it will be placed back into the tool magazine 44 by the automatic tool change arm 45.

The work support 19 with the threaded pipe 12a mounted thereon will now be shuttled to an unload position U, where the pipe 12a can be dismounted from the mounting device 20 "off-line" and the next loaded part can immediately be shuttled to the operative machining position O within the machining center 10 for the process to continue. The new part is automatically centered and the process is repeated.

Figure 13:
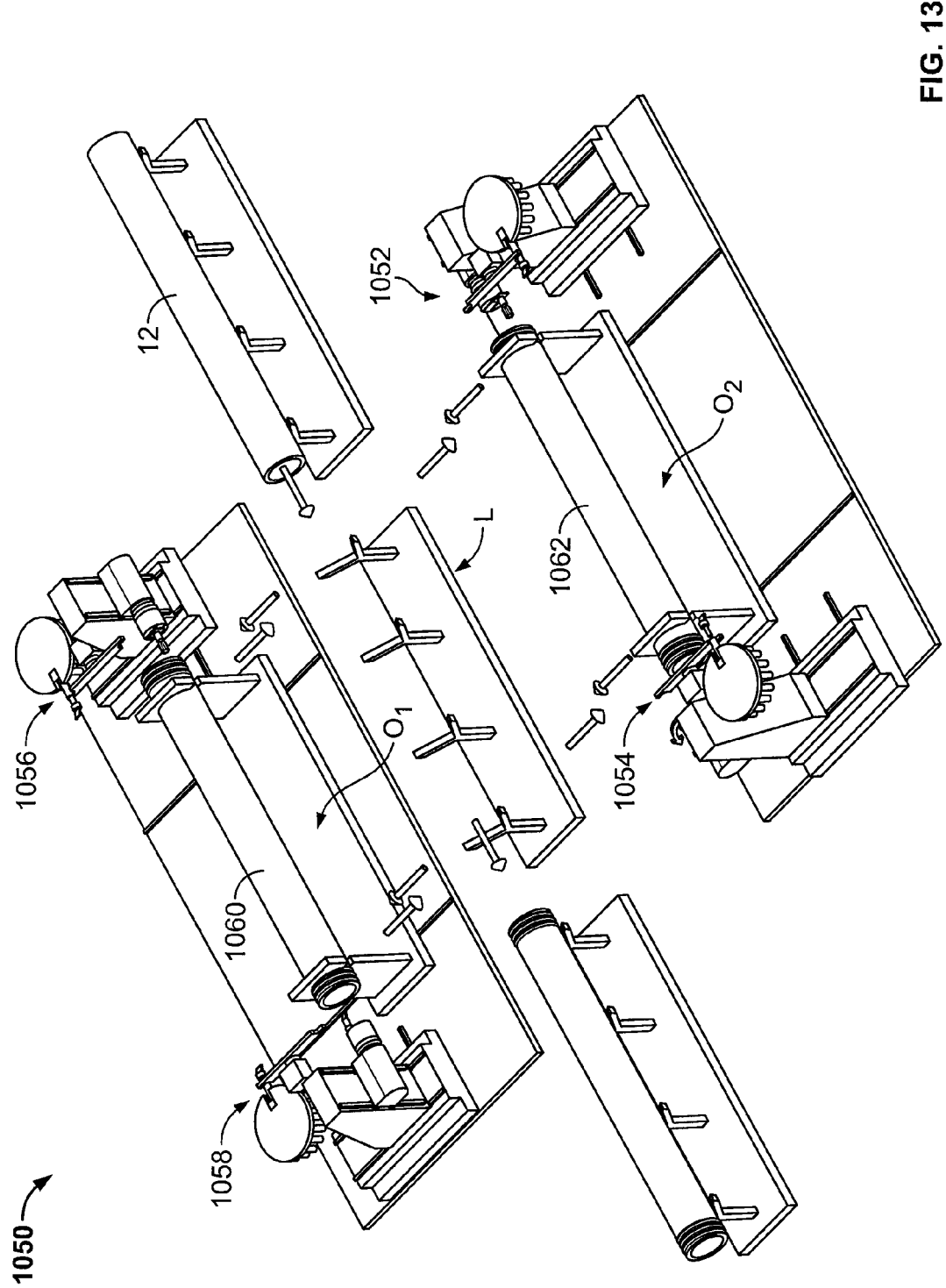
FIG. 13 is a perspective view of an alternative material flow layout using four machining centers so that both ends of two work pieces can be machined at the same time.

Turning to FIG. 13, an alternative work flow system 1050 is illustrated showing a single-file material flow layout in which at least four separate machine centers 1052, 1054, 1056, and 1058 are position to machine opposing ends of two work pieces 1060 and 1062 at the same time. That is, two work pieces are each in an operative position O1 and O2 at the same time, which are preferably fed single file from a single loading position L. In use, the work piece 12 is shuttled between the machine centers and loaded into one or the other of the operative positions O1 or O2. Then, another work piece 12 to be machines is shuttled between the machine centers and loaded into the other of the operative positions O1 or O2. When machining is complete on each work piece, they are consecutively ejected from the machine, and new work pieces may then be again loaded by repeating the procedure.

It will be understood that various changes in the details, materials, and arrangements of the parts and components that have been described and illustrated in order to explain the nature of the method and apparatus for machining work pieces may be made by those skilled in the art within the principle and scope of as described herein.

What is claimed is:

1. An apparatus for machining a curved surface on a pipe having a longitudinal center axis using a multi-axial machine head, the apparatus comprising:

a work support configured to hold the work piece stationary without rotary or translational movement of the work support or work piece during the machining;

a machine head configured to and operative to move in a rotary direction and multiple linear directions relative to the work piece including a machine head rotary direction, a machine head linear feed-in direction along the longitudinal center axis, a machine head linear feed-out direction orthogonal to the longitudinal center axis, and a machine head linear vertical direction orthogonal to the longitudinal center axis, the rotary and multiple linear directions of movement of the machine head allowing for rapid mounting of the pipe to the work support without the need for precision locators for aligning the pipe on the work support;

a rotary spindle positioned on the machine head and configured to translate with the machine head relative to the pipe in the machine head linear feed-in direction, the machine head linear feed-out direction, and the machine head linear vertical direction and to rotate relative to the pipe about the longitudinal center axis for the curved surface with the feed-in direction being generally parallel to the longitudinal center axis; and a thread cutting tool mounted on the rotary spindle and configured to translate relative thereto in a tool feed-out direction relative to the machine head and orthogonal to the longitudinal center axis of the stationary curved surface to engage and to machine the stationary curved surface with the machine head linear feed-out direction used for large horizontal adjustments of the machine head and rotary spindle thereon and the tool feed-out direction used for fine horizontal adjustments of the thread cutting tool for cutting threads to a precision depth.

2. The apparatus of claim 1, having a plurality of work supports each supporting a pipe and each work support being positioned for shifting into:

an operative position adjacent the machine head for machining;

a loading position of the work support spaced from the operative position; and an unloading position where the work piece is removed from the work support.

3. The apparatus of claim 1, further comprising:

a movement device operative to shuttle the respective work supports from the loading position to the operative position.

4. The apparatus of claim 2, further comprising:

the machine head being located to face an open end of the stationary pipe during the machining operation.

5. The apparatus of claim 4, further comprising:

a second machine head facing a second open end of the pipe such that two ends of the pipe can be machined simultaneously, the second machine head configured to and operative to move in a rotary direction and multiple linear directions relative to the pipe including a second machine head rotary direction, a second machine head linear feed-in direction along the longitudinal center axis, a second machine head linear feed-out direction orthogonal to the longitudinal center axis, and a second machine head linear vertical direction orthogonal to the longitudinal center axis;

a second rotary spindle positioned on the second machine head and configured to translate with the second machine head relative to the pipe in the second machine head linear feed-in direction, the second machine head linear feed-out direction, and the second machine head linear vertical direction and to rotate relative to the pipe about the longitudinal center axis for the curved surface with the second machine linear feed-in direction being generally parallel to the longitudinal center axis and opposite to the machine hear linear feed-in direction; and a second thread cutting tool mounted on the second rotary spindle and configured to translate relative thereto in a second tool feed-out direction relative to the second machine head and orthogonal to the longitudinal center axis of the stationary curved surface to engage and to machine the second end of the pipe so that the second machine head linear feed-out direction is used for large horizontal adjustments of the second machine head and second rotary spindle thereon and the second tool feed-out direction is used for fine horizontal adjustments of the second thread cutting tool for cutting threads to a precision depth on the second end of the pipe.

6. The apparatus of claim 1, further comprising:

a controller configured to calculate the center axis of the pipe using inputs from a touch probe and configured to adjust a machine zero point of a machine coordinate system to the calculated center axis; and the spindle being mounted on the apparatus which is configured to shift the spindle to align its rotational axis to the pipe center axis.

7. The apparatus of claim 1, further comprising:

a thread cutting insert on the cutting tool to cut a thread on an end of the pipe.

* * * * *

UNITED STATES PATENT AND TRADEMARK OFFICE
CERTIFICATE OF CORRECTION

PATENT NO. : 8,087,857 B2
APPLICATION NO. : 12/719375
DATED : January 3, 2012
INVENTOR(S) : Bernard Edward Schawe Page 1 of 1

It is certified that error appears in the above-identified patent and that said Letters Patent is hereby corrected as shown below:

<u>Title page, item [57] In the Abstract</u>

Column 2, line 8, in the Abstract, delete "and the" and insert -- for --.

Claim 5, Column 14, Line 18, delete "hear" and insert -- head --.

Signed and Sealed this
Twenty-eighth Day of August, 2012

David J. Kappos
*Director of the United States Patent and Trademark Office*